(12) United States Patent
Jenkins

(10) Patent No.: US 10,002,542 B1
(45) Date of Patent: Jun. 19, 2018

(54) METHOD OF PLAYING A MUSICAL KEYBOARD

(71) Applicant: Steven Jenkins, Fort Worth, TX (US)

(72) Inventor: Steven Jenkins, Fort Worth, TX (US)

( * ) Notice: Subject to any disclaimer, the term of this patent is extended or adjusted under 35 U.S.C. 154(b) by 0 days. days.

(21) Appl. No.: 15/613,644

(22) Filed: Jun. 5, 2017

(51) Int. Cl.
*G09B 15/02* (2006.01)
*G10G 1/02* (2006.01)
*G09B 15/08* (2006.01)

(52) U.S. Cl.
CPC ........... *G09B 15/02* (2013.01); *G09B 15/023* (2013.01); *G09B 15/08* (2013.01); *G10G 1/02* (2013.01)

(58) Field of Classification Search
CPC .............................. G09B 15/02; G09B 15/023
USPC .......................... 84/483.2, 478, 485 SR, 609
See application file for complete search history.

(56) References Cited

U.S. PATENT DOCUMENTS

| | | | | | |
|---|---|---|---|---|---|
| 1,840,903 | A * | 1/1932 | Hurst | ....................... | G10B 1/00 84/477 R |
| 2,977,836 | A * | 4/1961 | Lang | ........................ | G10C 3/12 84/471 R |
| 3,369,439 | A * | 2/1968 | Burdet | ................... | G09B 15/02 84/483.1 |
| 3,403,590 | A * | 10/1968 | Quinton | ................. | G09B 15/06 84/314 R |
| 3,752,031 | A * | 8/1973 | Mohos | ..................... | G10G 1/02 84/471 R |
| 3,827,330 | A * | 8/1974 | Ward | .................... | G09B 15/023 84/472 |
| 4,640,173 | A * | 2/1987 | Coles | ................... | G10H 1/0008 84/442 |
| 4,885,969 | A * | 12/1989 | Chesters | .................. | G10C 3/12 84/423 A |
| 5,085,116 | A * | 2/1992 | Nakata | ...................... | G10G 3/04 84/462 |
| 5,574,238 | A * | 11/1996 | Mencher | .............. | G09B 15/006 84/478 |
| 5,886,273 | A * | 3/1999 | Haruyama | ............. | G09B 15/08 84/478 |
| 5,907,115 | A * | 5/1999 | Matsunaga | .......... | G09B 15/003 84/464 A |
| 6,201,174 | B1 * | 3/2001 | Eller | .................... | G09B 15/003 84/454 |
| 6,388,181 | B2 * | 5/2002 | Moe | ....................... | G09B 15/08 84/470 R |
| 6,821,203 | B2 * | 11/2004 | Suga | ...................... | A63F 13/10 463/37 |

(Continued)

*Primary Examiner* — David Warren

(57) ABSTRACT

A method of playing a musical keyboard comprises four main steps. The first step involves providing a guide comprising multiple columns aligned with keys on the musical keyboard. The columns are further divided into rows defining multiple blocks containing color codes and numbers. The numbers are arranged in arithmetic progression in each color code extending across a single row. The second step involves playing a first key on the musical keyboard based on a selected color code represented in each predetermined row. The third step involves playing the subsequent keys on the musical keyboard as per the arithmetic progression of numbers in the subsequent rows. The fourth step involves shifting to a subsequent row of the sheet, to start playing a selected key and the subsequent keys on the musical keyboard based on the next color code and corresponding numbers represented in the subsequent rows.

4 Claims, 3 Drawing Sheets

(56) References Cited

U.S. PATENT DOCUMENTS

| | | | | |
|---|---|---|---|---|
| 6,915,488 B2* | 7/2005 | Omori | G10H 1/0008 | 434/227 |
| 7,030,307 B2* | 4/2006 | Wedel | G09B 15/02 | 84/477 R |
| 7,212,213 B2* | 5/2007 | Steinberg | G10H 1/0008 | 345/440 |
| 7,462,772 B2* | 12/2008 | Salter | G10H 1/0025 | 84/477 R |
| 7,629,527 B2* | 12/2009 | Hiner | G09B 15/02 | 84/470 R |
| 7,674,964 B2* | 3/2010 | Ohmura | G10H 1/0008 | 84/464 A |
| 7,750,224 B1* | 7/2010 | Rav-Niv | G09B 15/009 | 84/483.1 |
| 7,893,337 B2* | 2/2011 | Lenz | G09B 15/02 | 84/470 R |
| 8,232,467 B1* | 7/2012 | Goldberg | G10G 1/00 | 84/470 R |
| 9,129,583 B2* | 9/2015 | Little | G10H 1/0016 | |
| 9,230,526 B1* | 1/2016 | Cook | G10H 1/0033 | |
| 2004/0055441 A1* | 3/2004 | Katsuta | G09B 15/00 | 84/470 R |
| 2004/0074376 A1* | 4/2004 | Varme | G10G 1/00 | 84/483.2 |
| 2005/0011339 A1* | 1/2005 | Kerkhoff | G09B 15/08 | 84/478 |
| 2006/0252503 A1* | 11/2006 | Salter | G09B 5/06 | 463/25 |
| 2007/0234878 A1* | 10/2007 | Worrall | G10H 1/0016 | 84/485 R |
| 2007/0256540 A1* | 11/2007 | Salter | G09B 15/00 | 84/485 R |
| 2008/0087160 A1* | 4/2008 | Gabert | G09B 21/003 | 84/478 |
| 2008/0141849 A1* | 6/2008 | Johnston | G09B 15/02 | 84/483.2 |
| 2009/0266222 A1* | 10/2009 | Epstein | G09B 15/026 | 84/483.2 |
| 2010/0257993 A1* | 10/2010 | Brow | G09B 15/02 | 84/478 |
| 2011/0259176 A1* | 10/2011 | Pillhofer | G09B 15/002 | 84/470 R |
| 2013/0319207 A1* | 12/2013 | King | G09B 15/023 | 84/471 R |
| 2014/0041512 A1* | 2/2014 | Mastran | G09B 15/023 | 84/483.2 |
| 2015/0367239 A1* | 12/2015 | Epstein | A63F 13/10 | 84/485 R |

* cited by examiner

METHOD OF PLAYING A MUSICAL KEYBOARD

BACKGROUND OF THE INVENTION

The invention disclosed herein generally relates to a method of playing a musical keyboard. More particularly, the invention disclosed herein relates to method of playing keys on a musical keyboard using a guide containing codes and timing to play each key.

DESCRIPTION OF THE PRIOR ART

Learning a musical keyboard requires ample focus and skill from a user and it's a time-consuming process, especially while learning a piano. When learning to play a piano, or similar other instruments such as the organ, synthesizer, etc., the conventional training techniques employed in doing the same requires a user to learn the musical notations, as known in the art. The term 'musical notations' refer to a combination of dots represented on a five-line staff which progresses from a first line to a second line and so on. Such conventional training methods take a few months to a few years to master depending on the skill and time availability of the user/student, since each student must learn the abstract form of musical notations.

The musical notations are represented with their timings, and mainly comprise filled or void circles denoted on a staff which represents half notes, quarter notes, eighth notes, and so on. Here, each note must be interpreted into a set of play actions using the fingers of the student to press a set of keys on a keyboard in a predefined sequence and timing as represented by the musical notations. The student becomes flexible in playing the piano only after mastering the art of playing such abstract form of representation of written musical notations. This mastering of the art of playing musical notations is a difficult task owing to multiple reasons ranging from time availability, study material availability, and the skill required from the user in learning the same. Thus, many students, especially children find the above-mentioned learning technique undesirable. Further, most of the adult students tend to seek for easier methods to learn the same, but such easier methods might not justify the right way of learning the piano as well.

Hence, there is a long felt but unresolved need for a new method of playing a musical keyboard. A method that is strictly according to the timing and notations on a conventional notation book, but which is represented more graphically, and which is easier for the student to interpret.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

A method of playing keys on a musical keyboard comprises four main steps. The first step involves providing a guide comprising multiple columns and rows. In various embodiments, the guide is a graphical piano playing guide that includes all formats such as, paper, digital, virtual, etc. Each column is primarily black or white corresponding with musical keyboard key colors. Each column width corresponds to each corresponding musical keyboard key width. Each column is configured to be aligned with a key on the musical keyboard. The columns are further divided into rows which separate the progression of keys to be played on a musical keyboard establishing the chordal structure of a song. Each row has an assigned color indicating the grouping of keys to be played on the musical keyboard for the defined musical chord. All keys within a color-coded row are harmonious and may be played together all at once in unison or individually and may be played in any sequential order. Some rows have numbers arranged in ascending arithmetic progression extending across the row, indicating the sequential order individual musical keyboard keys are to be played after the chordal notes, to establish complimentary melodic song structure to the chordal structure of the row. Chorded notes within rows are typically shaded to distinguish between color-coded chords and color-coded numbered melodic notes within a row. Blocks are used to indicate start and stop points for larger groups of musical sequences. Blocks are comprised multiple rows separated by horizontal lines. The second step involves playing a first key or group of keys on the musical keyboard based on a selected color-coded row within a block of music. The third step involves playing the subsequent keys on the musical keyboard according to the arithmetic progression of numbers within the predetermined row containing the first color code. Finally, the fourth step involves shifting to a subsequent color-coded row of the sheet, repeating the successive steps in the third step.

In an embodiment, the single-color code represented without the numbers across the row prompts a user to play the corresponding keys on the musical keyboard simultaneously to define a musical chord. In an embodiment, the single-color code represented with numbers across the row prompts a user to play the corresponding keys on the musical keyboard simultaneously to define a musical chord, then playing the keys corresponding to numbers in ascending order to define the individual melodic notes of a song. In an embodiment, the beginning predetermined row is a bottom row of the guide when a song is played on the musical keyboard from the start of the song ascending upwards on successive rows towards the end of the song. In some instances, each notation of the song is sequenced on each row from the bottom row to a top row of the guide.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DESCRIPTION OF THE PREFERRED EMBODIMENT

Figure 1:
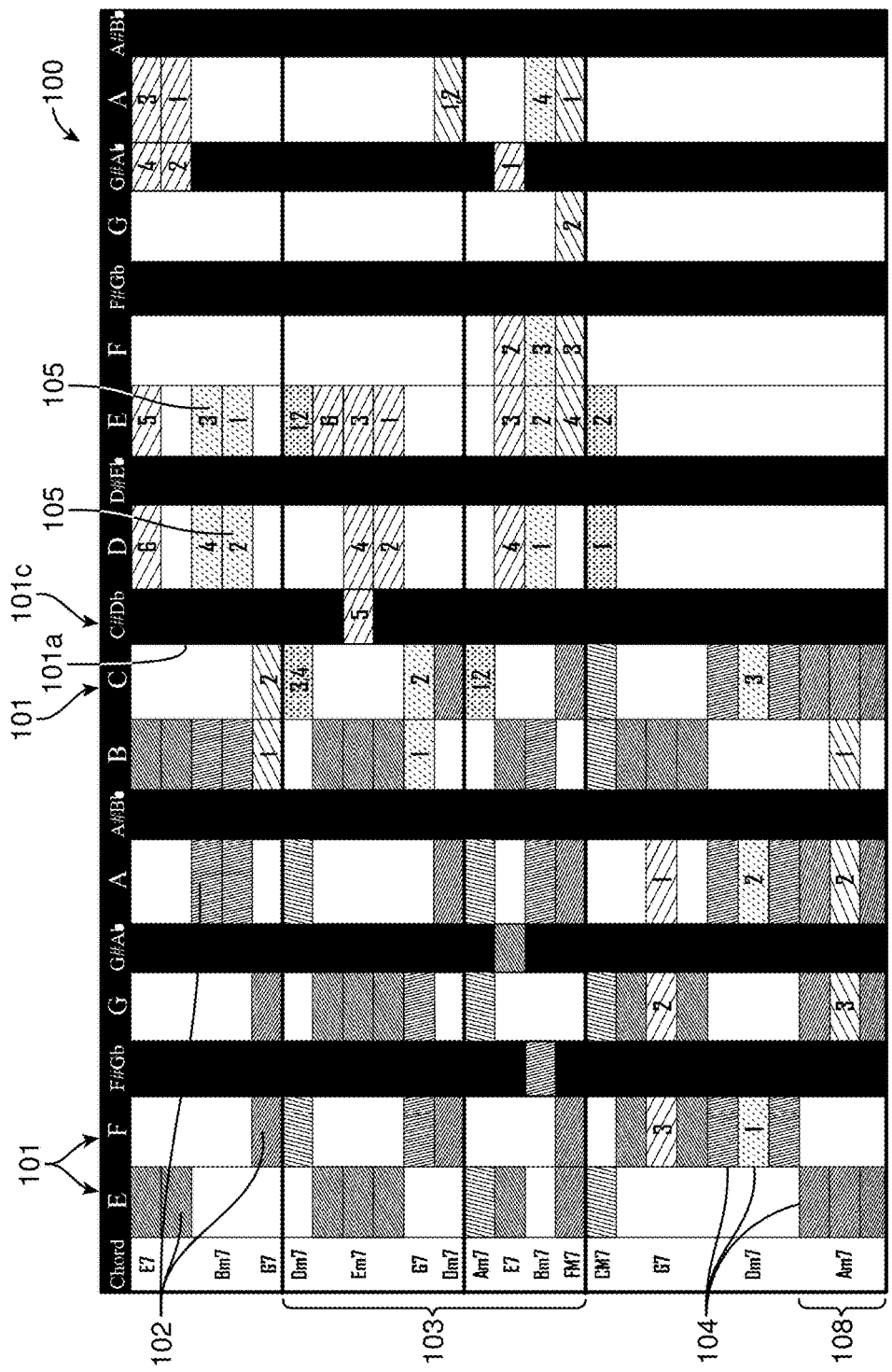
FIG. 1 exemplarily illustrates a top plan view of a guide which provides graphical representation of musical data for reading the notes with their respective timing, for playing the keys on a musical keyboard.
Figure 2:
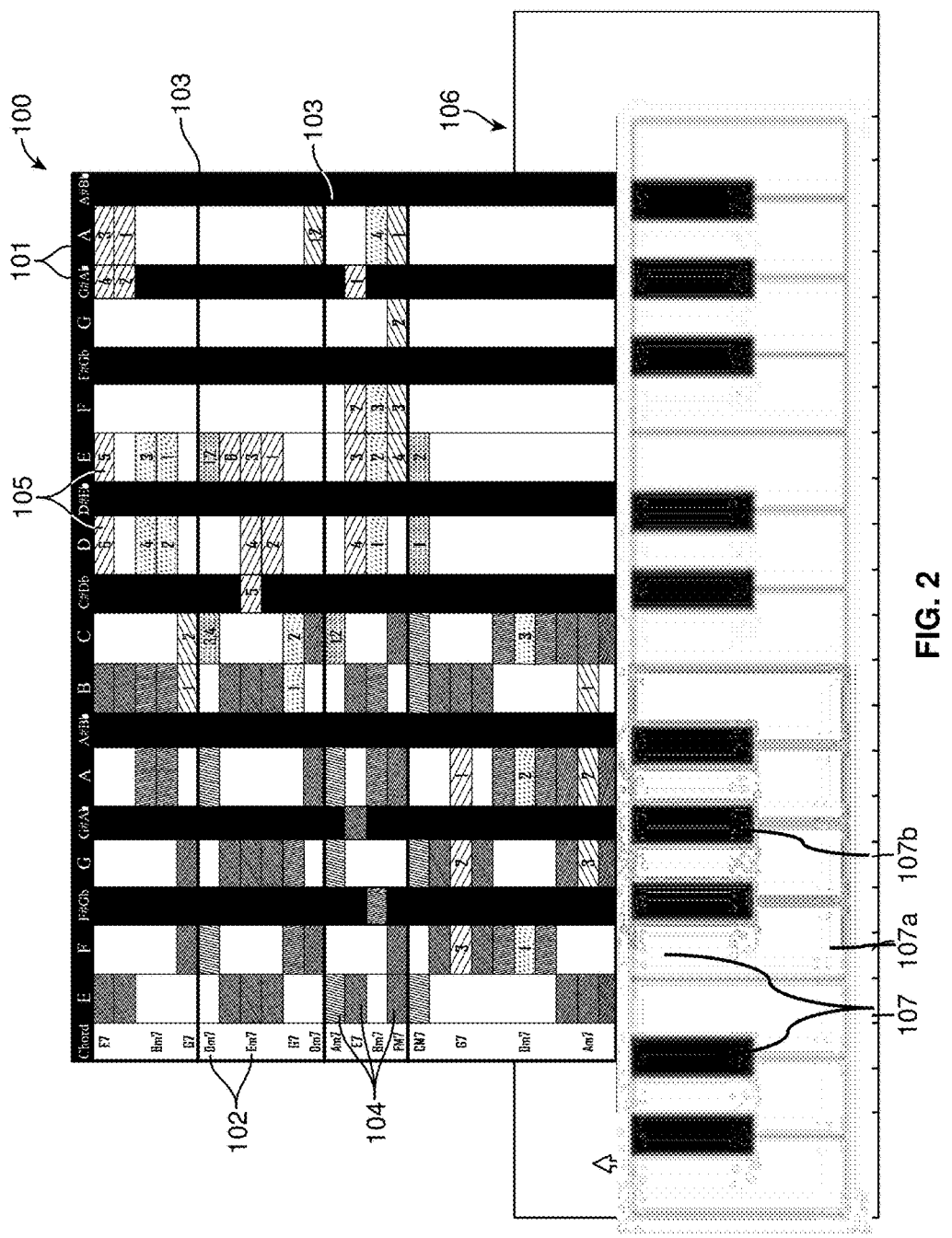
FIG. 2 exemplarily illustrates a top perspective view of the guide aligned with the keys on the musical keyboard, explaining a method of playing the musical keyboard.

FIG. 1 exemplarily illustrates a top plan view of a guide 100 which provides graphical representation of musical data for reading the notes with their respective timing, for playing the keys 107 on a musical keyboard 106 which is shown in FIG. 2. In various embodiments, the guide is a graphical piano playing guide that includes all formats such as, paper, digital, virtual, etc. For an instance, the guide 100 disclosed here is a normal paper sheet 100 which is divided into multiple columns 101 and rows 102. Each column 101 is divided into multiple rows 102 comprising blocks: indicating groups of musical cords to compose larger musical phrases. For example, according to the FIG. 1, the first column 101 is an 'E' note and the columns extends till 'A#' note in the 19$^{th}$ column, that is, E-F-F#-G-G#-A-A#-B-C-C#-D-D#-E-F-F#-G-G#-A-A#. In this embodiment, the guide 100 is divided at a predefined point 101a between two selected columns 101b and 101c, where a left portion of the division 101a is played with a left hand of the user, and a right portion of the division 101a is played with a right hand of the user. In other words, the set of columns 101 which represent the notes from E to C is considered as a first half, and the set of columns 101 representing the notes from C# to A# is considered as the second half. The first half is configured to be played with the left hand of the user, and the second half is configured to be played with the right hand of the user. The song chosen as an example to demonstrate the working of this guide 100 is 'Fly Me to the Moon©' by Frank Sinatra.

FIG. 2 exemplarily illustrates a top perspective view of the guide 100 aligned with the keys 107 on the musical keyboard 106, explaining a method of playing the musical keyboard 106. The method of playing the keys 107 on the musical keyboard 106 comprises four main steps. The first step involves providing the user a guide 100 comprising multiple columns 101, and each column 101 is configured to be aligned with a key 107 on the musical keyboard 106. The columns 101 are further divided into rows 102 multiple rows make up a block 103, and each block 103 comprises one or combination of color codes 104 and numbers 105. Some of the blocks 103 will just have rows with the color code 104, while some of the blocks 103 will have the rows with the color code 104 and the number 105 superimposed on the color code 104. The size of the guide 100, and accordingly the columns 101 and the rows 102 can be prepared depending on the size of the keys 107 on the musical keyboard 106. For example, the size of the keys 107 on a piano is different than the size of the keys 107 on an arranger keyboard, so the size of the column 101 must be precisely designed as per the size of the major keys 107a and sharp keys 107b on any such musical keyboards 106.

The numbers 105 are arranged in arithmetic progression in each color code 104 extending across a single row 102. According to the example shown in FIG. 1, each row 102 will have a single-color code 104 in some instances with numbers 105 increasing in their arithmetic progression. The second step involves the user playing a first key or keys 107 on the musical keyboard 106 based on a selected color code 104 represented in each row 103 of a predetermined row 102 of the guide 100. The predetermined row 102 could be the bottom-most row 102 or any other row 102 depending on the portion from which the user wants to start the song. The third step involves the user playing the subsequent keys (106, 107, & 105 in FIG. 2) 107 on the musical keyboard 106 according to the arithmetic progression of numbers 105 in the subsequent row 102 containing the first color code 104. In other words, the numbers 105 in the progression 1-2-3 in each row 103 represents that the user must press the keys 107 (1, 2, and 3) in a predefined timing which defines the musical pattern of the song.

Finally, the fourth step involves the user shifting to a subsequent row 102 of the guide 100. Here, the user starts playing a selected key or keys 107 and the subsequent keys 107 on the musical keyboard 106 based on the next color code 104 and the corresponding numbers 105 represented in the-subsequent row repeating the successive steps in the third step. 102. The fourth step represents how the song should be progressively played along the representation of the numbers 105 and color codes 104 on the guide 100. The user shifts from the first predefined starting row 102 to a subsequent row 102 to play the next portion of the notes of the song, and each note is played on the keys 107 of the musical keyboard 106 according to the interpretation of the color code 104 and the sequential numbers 105 in that particular row 102.

Figure 3:
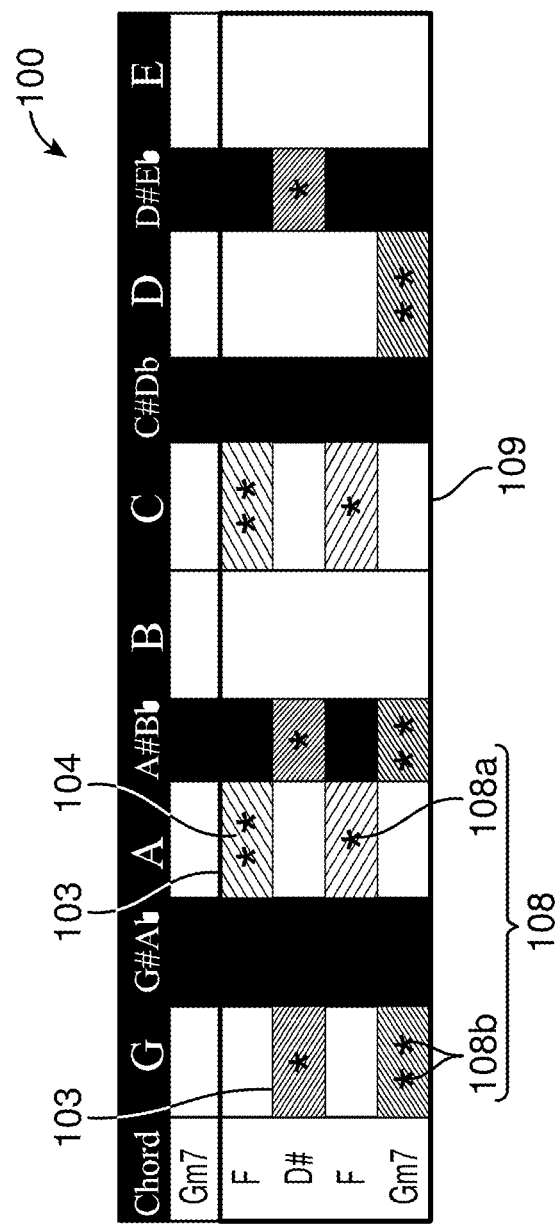
FIG. 3 exemplarily illustrates a top perspective view of a portion of an embodiment of the guide showing the representation of chords on the sheet.

In an embodiment, the single-color code 104 represented without the numbers 105 across the row 102 prompts a user to play the corresponding keys 107 on the musical keyboard 106 simultaneously to define a musical chord. In an embodiment, the predetermined row 108 (FIG. 1), as discussed above, is a bottom row 108 of the guide 100 which is considered as the first row 108 when a song is played on the musical keyboard 106 from the start to the end of the song. Each notation of the song is sequenced in each block 103 on each row 102 from the bottom row 102 to the top row 102 of the sheet 100. The example shown here in FIG. 3 represents the song 'Fly Me to the Moon©' by Frank Sinatra, which is represented on the guide 100 and positioned in alignment with the keys 107 on the musical keyboard 106.

The piano guide 100 provides advantage over existing music learning tools by allowing the learner or user to be able to play the musical keyboard 106, for example, piano, without requiring any knowledge of musical theory. The learner does not need to read traditional sheet music, and does not need to know musical scales or the piano key names. Using the piano guide 100 the user can play the songs on the piano immediately. Some modern alternatives to traditional piano learning methods feature video game like computer generated simulations that show users the piano keys to play for musical songs. However, using these methods, the user must keep up with the moving simulations to play the songs on the piano. These methods also necessitate the user to have a tablet, computer or other visual interface to view and run the simulations. The user can only see the next notes as the simulation progresses to a certain point of the song.

The piano guide 100 provides a static reference to show which keys to play, thereby allowing the user to go at his/her own pace without the stress keeping up with and referring to moving objects. The piano guide 100 also lays out the entire musical composition in front of the learner allowing the learner to see the entire song structure at once. The piano guide 100 separates musical progressions by color codes 104, allowing the learner to easily see which piano notes are grouped together. The piano sheet 100 informs the learner of the progression of notes, and which keys 107 to play by numbering the color coded piano patterns. To play songs on piano, the learner is only required to align the piano sheet 100 with keys 107 on the piano 106, then following the color coded, and if indicated, numerical patterns 105 on the piano sheet 100, and to play the keys 107 on the piano 106 in the order indicated.

The single-color code 104 sections typically are played by the left hand however they may also be played by the right hand or both hands, whichever is most comfortable to the user. The shaded sections primarily indicate to the user to play those keys 107 prior to playing the unshaded numbered keys 107 of the same color. The single-color code 104 shaded keys may be played altogether at once as a "chord" or they may be layered together as an "arpeggio", which is referred to a type of broken chord structure where notes are played in a layered or staggered fashion. After the single-color coded 104 sections are played either with left/right hand, as a "chord" or "arpeggio", the unshaded numerical sequence of notes should be played. In other words, the row 102 with color codes 104 and without any numbers 105 alone should be played. In an example, the unshaded numerical sequence of notes are primarily played with the right hand, but however, they may be played with either hands. It is also advisable to hold or continue playing the shaded notes during the progression of unshaded numerical sequential notes. However, some songs do not require numerical sequencing. Further, however, in the guide 100, in some instances, there are no indicators of musical duration or timing. The brevity of the notes being held is determined by the user.

FIG. 3 exemplarily illustrates a top perspective view of a portion of an embodiment of the guide 100 showing the representation of chords on the guide 100. In some sheets 100, there is a need for a series of chords to be played in rapid succession as if they were individual notes. This is represented by the dots 108 within a row 102 within a block 103 with a predetermined color code 104. In an example, the single dot 108a indicates the user to play a chord once before progressing to a chord above, and the double dots 108b indicate the user to play the chord twice before progressing to a chord above. The musical pattern group is indicated by the bold line 109 bordering the blocks 103.

The foregoing examples have been provided merely for the purpose of explanation and are in no way to be construed as limiting of the method, disclosed herein. While the method has been described with reference to various embodiments, it is understood that the words, which have been used herein, are words of description and illustration, rather than words of limitation. Further, although the method has been described herein with reference to particular means, materials, and embodiments, the method is not intended to be limited to the particulars disclosed herein; rather, the method extends to all functionally equivalent structures, methods and uses, such as are within the scope of the invention. Although there has been shown and described the preferred embodiment of the present invention, it will be readily apparent to those skilled in the art that modifications may be made thereto.

I claim:

1. A method of playing keys on a musical keyboard comprising:
   providing a guide comprising a plurality of columns, each column configured to be aligned with a key on the musical keyboard, the columns divided into rows defining keyboard positions of musical notes to be played by user, wherein each row comprising a color code corresponding to a desired chord to be played and numbers, wherein the numbers are arranged in ascending numerical progression in each color code extending across a single row;
   blocks comprising multiple rows indicating groupings of chords to compose a larger musical phrase;
   playing a first key or multiple keys on the musical keyboard based on a selected color code corresponding to the desired chord to be played represented in each row of the musical guide;
   playing subsequent keys on the musical keyboard according to the ascending progression of numbers in the predetermined row containing the first color code; and
   shifting to a subsequent row of the guide, to start playing a selected key and the subsequent keys on the musical keyboard based on the next color code corresponding to the desired chord to be played and corresponding numbers represented in the subsequent row.

2. The method of claim 1, wherein the single color code represented without the numbers across the blocks in a selected row prompts a user to play the corresponding keys on the musical keyboard simultaneously to define a musical chord.

3. The method of claim 1, wherein the starting predetermined row is a bottom row of the guide when a song is played on the musical keyboard from the start of the song to the end of the song, wherein each notation of the song is sequenced in each row from the bottom row to a top row of the guide.

4. The method of claim 1, wherein the guide is divided at a predefined point between two selected columns, wherein a left portion of the division is played with a left hand of the user and a right portion of the division is played with a right hand of the user.

* * * * *